(12) United States Patent
Tiras

(10) Patent No.: US 6,401,459 B1
(45) Date of Patent: Jun. 11, 2002

(54) FUEL GAS CONDITIONING SYSTEM WITH DEW POINT MONITORING

(75) Inventor: Craig S. Tiras, Houston, TX (US)

(73) Assignee: Rosewood Equipment Company, Plano, TX (US)

( * ) Notice: Subject to any disclaimer, the term of this patent is extended or adjusted under 35 U.S.C. 154(b) by 29 days.

(21) Appl. No.: 09/711,630

(22) Filed: Nov. 13, 2000

(51) Int. Cl.$^7$ .............................. F02C 1/00; F02C 7/08
(52) U.S. Cl. ......................................... 60/772; 60/736
(58) Field of Search ................................... 60/772, 736

(56) References Cited

U.S. PATENT DOCUMENTS 6,167,692 B1 * 1/2001 Anand et al. ............. 60/39.12
6,233,916 B1 * 5/2001 Anand et al. ............ 60/39.465

* cited by examiner

Primary Examiner—Charles G. Freay
(74) Attorney, Agent, or Firm—Standley & Gilcrest LLP

(57) ABSTRACT

A method and system for monitoring the dew point of a fuel gas for a combustion turbine. A flow of fuel gas is filtered of particulate matter and liquid droplets in an aerosol interception and removal system. The pressure of the filtered fuel gas may be reduced at a pressure reduction station. The flow of fuel gas is analyzed by a dew point monitoring device that sends a signal to the heating system. The heating system may then adjust the temperature of the fuel gas flow within the permissible range necessary for operation of the combustion turbine. The filtered flow of fuel gas is then directed to a heating system where the temperature of the fuel gas is regulated. The flow of the heated flow of fuel gas may then be regulated at a flow metering station. The heated flow of fuel gas is then sent to a combustion turbine's combustion chamber.

14 Claims, 2 Drawing Sheets

FUEL GAS CONDITIONING SYSTEM WITH DEW POINT MONITORING

BACKGROUND AND SUMMARY OF THE INVENTION

The present invention relates generally to monitoring the dew point of a fuel gas in a combustion turbine. Specifically, the present invention relates to a method and system for regulating the temperature of a fuel gas mixture used by combustion turbines by monitoring the dew point of the fuel gas mixture in the combustion chamber.

Many gas fired turbines require 50 degrees (Fahrenheit) of "superheat" to operate under normal conditions. "Superheat" is heat over and above the dew point of the gas. Dew point is the temperature at which a given gas will be saturated with a liquid, it is the temperature at which the liquid will begin to condense. Many power producers heat their fuel gas regardless of the temperature to insure that it meets the 50-degree Fahrenheit minimum requirement.

As a result, several different systems have been developed to ensure that the fuel gas is heated by at least 50 degrees Fahrenheit above the dew point temperature. These systems typically waste energy by heating the fuel stream in excess of the 50-degree Fahrenheit minimum.

In light of the shortcomings of known systems, a need exists for a more efficient system for superheating the fuel gas stream. The present invention provides a dew point monitoring system. A preferred embodiment of the present invention is particularly useful to minimize the energy load of superheating a fuel gas stream. A preferred embodiment of a system of the present invention may also include the basic controls, instrumentation, and piping for the system to work together.

In a preferred embodiment of the present invention, the pressure of a flow of fuel gas is reduced at a pressure reduction station prior to entering an aerosol interception and removal system. In the aerosol interception and removal system particulate matter may be filtered out and liquid droplets may be coalesced. Upon exiting the aerosol interception and removal system, a dew point monitoring device sends a signal to the heating system. The filtered flow of fuel gas is then directed to a heating system where the temperature of the fuel gas is regulated. The heating system receives information from the dew point monitoring system such that the heating system may adjust the temperature of the fuel gas flow within the permissible range necessary for operation of the combustion turbine. The flow of the heated flow of fuel gas may then be regulated at a flow metering station. The heated flow of fuel gas is then sent to a combustion turbine's combustion chamber.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

The present invention is directed to a method and a system for regulating the temperature of a fuel gas used by combustion turbines by monitoring the dew point of the fuel gas in the combustion chamber.

Figure 1:
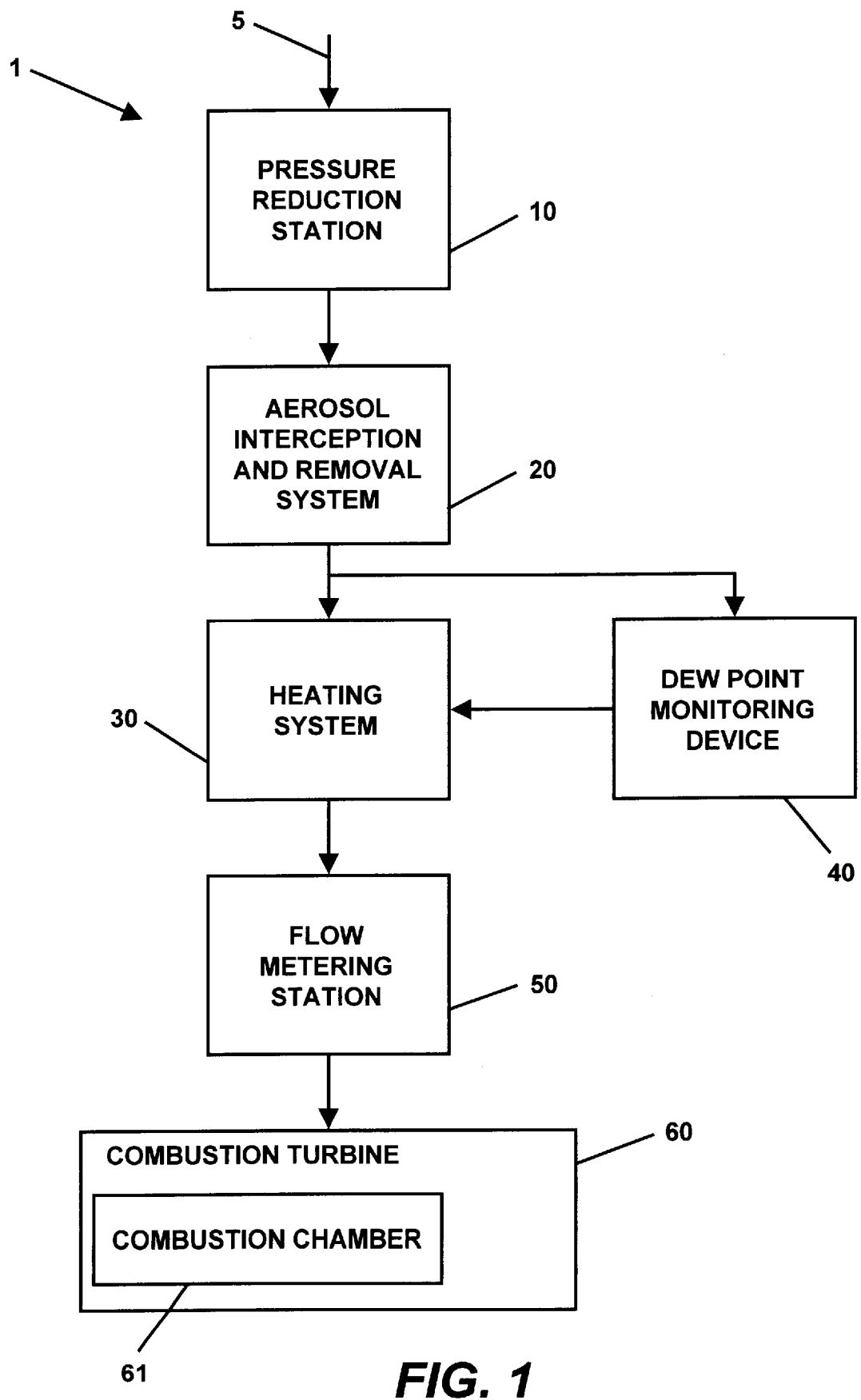
FIG. 1 is a block diagram of a preferred embodiment of a system of the present invention.

The operation of a preferred system 1 will now be described with general reference to the block diagram of FIG. 1. A fuel gas supply inlet 5 preferably supplies a pressure reduction station 10 where the pressure of the fuel gas may be regulated. The fuel gas exiting the pressure reduction station is preferably directed to an aerosol interception and removal system 20 where removal of liquid droplets may occur. Fuel gas exiting the aerosol interception and removal system 20 preferably passes to a dew point monitoring device 30 before being directed to the heating system 40 where energy may be added to the fuel gas in order to raise its temperature. The dew point monitoring device 30 preferably sends a signal to the heating system 40. The heating system 40 may then adjust the temperature of the conditioned fuel gas within the permissible range necessary for operation of the combustion turbine 60. Upon exiting the heating system 40 the fuel gas is said to be "conditioned". The flow rate of the conditioned fuel gas may be regulated by a flow metering system 50. Fuel gas exiting the heating system 40 is preferably directed to the combustion chamber 61 of a combustion turbine 60.

Figure 2:
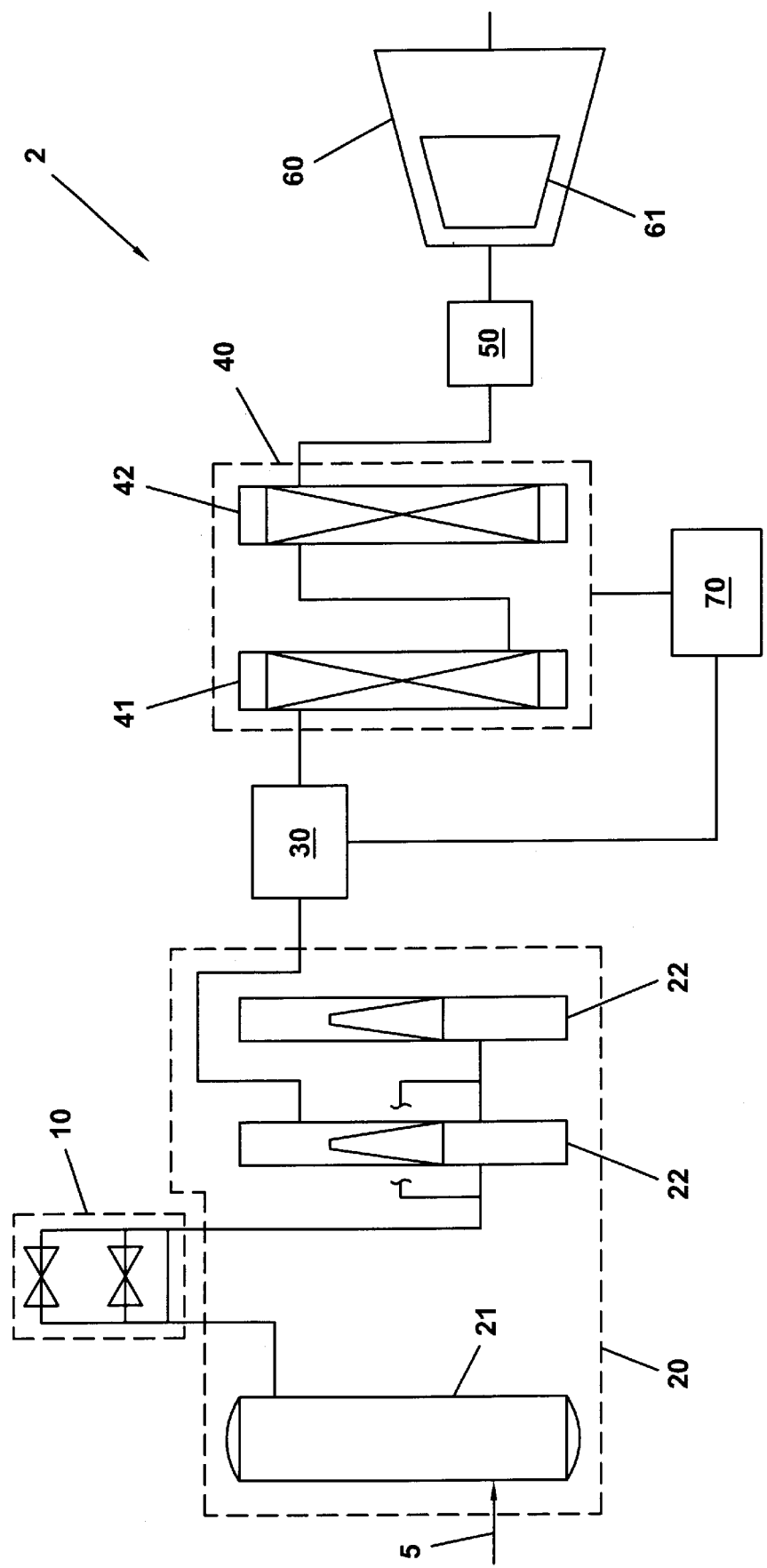
FIG. 2 is a product flow diagram of a preferred embodiment of a system of the present invention.

The operation of a preferred system 2 will now be described with general reference to the product flow diagram of FIG. 2. The fuel gas supply inlet 5 preferably supplies a scrubber 21 with fuel gas where liquid removal down to about 10-micron droplet size may occur. The fuel gas pressure may be regulated at the pressure reduction station 10. Fuel gas exiting the scrubber 21 preferably passes to at least one filter/coalescer 22 wherein removal of liquids down to about a 0.1-micron droplet size may occur. Fuel gas exiting the aerosol interception and removal system 20 preferably passes to a dew point monitor 30. The dew point monitoring device 30 preferably sends a signal to a programmable controller 70 or any other suitable device. The programmable controller 70 may then adjust the heating system 30 to substantially maintain the desired temperature of the conditioned fuel gas within the permissible range necessary for operation of the combustion turbine 60. Upon exiting the dew point monitor 30 the fuel gas then preferably enters an electric start-up heater 41 before entering the main heater 42. In the heating system 40, energy may be transferred into the fuel gas raising the fuel gas's temperature. Upon exiting the heating system 40, the fuel gas is said to be "conditioned". The conditioned fuel gas preferably enters a flow metering station 50 before passing to the combustion turbine 60. The conditioned fuel gas stream is then preferably directed to a combustion chamber 61 of a combustion turbine 60.

It is preferred to maintain the temperature of the conditioned fuel gas above the dew point temperature, preferably fifty degrees Fahrenheit above the dew point. If the temperature of the conditioned fuel gas is less than fifty degrees over the dew point temperature the turbine may back-flash and the power producer may incur both the cost of repairing turbines and the loss of income from equipment that is not producing electricity. If the temperature of the conditioned fuel gas gets more than fifty degrees above the dew point temperature, excess heating may occur resulting in money being wasted in heating the fuel gas stream.

The heating system preferably automatically adjusts the amount of heat it is placing into the fuel gas stream to substantially maintain the temperature of the conditioned fuel gas stream at fifty degrees Fahrenheit over the dew point.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A system for conditioning fuel gas for a combustion turbine having a combustion chamber, said system comprising:

a flow of a fuel gas;

an aerosol interception and removal system in fluid communication with said flow of fuel gas, said aerosol interception and removal system adapted to remove liquid droplets of fuel gas from said fuel gas flow;

a dew point monitoring device, said dew point monitoring device in fluid communication with said aerosol interception and removal system, said dew point monitoring device adapted to analyze said gas flow; and a heating system in fluid communication with said aerosol interception and removal system and adapted to receive as gas flow exiting said dew point monitoring device, said heating system having a controller adapted to regulate the temperature of said gas flow, said heating system adapted to receive said signal from said dew point monitoring device generated in response to said gas flow analysis so as to minimize superheating of said fuel gas flow.

2. The fuel gas conditioning system of claim 1 further comprising a pressure reduction station adapted to reduce the pressure of said fuel gas flow.

3. The fuel gas conditioning system of claim 1 wherein said heating system comprises a shell and tube heat exchanger.

4. The fuel gas conditioning system of claim 1 wherein said aerosol interception and removal system further comprises at least one scrubber.

5. The fuel gas conditioning system of claim 1 wherein said aerosol interception and removal system further comprises at least one filter/coalescer.

6. The fuel gas conditioning system of claim 1 wherein said heating system comprises at least one electric start-up heater.

7. The fuel gas conditioning system of claim 1 wherein said heating system comprises at least one hot water heater.

8. The fuel gas conditioning system of claim 1 wherein said heating system comprises at least one steam heater.

9. The fuel gas conditioning system of claim 1 further comprising a flow metering station, said flow metering station in fluid communication with said heating system, and adapted to regulate said fuel gas flow.

10. The fuel gas conditioning system of claim 5, wherein said dew point monitoring device is located after said filter/coalescer.

11. A method for regulating the dew point of a fuel gas in a combustion turbine having a combustion chamber, said method comprising:

passing a flow of a fuel gas to said combustion turbine;

measuring dew point data of said flow of fuel gas before said flow of fuel gas enters said turbine; and transmitting said dew point data to a heating system located between said dew point monitoring device and said combustion turbine whereby said heating system may regulate said heating of said flow of fuel gas entering said turbine.

12. A method according to claim 11 further comprising the step of filtering of said flow of fuel gas.

13. A method according to claim 11 further comprising the step of reducing the pressure of said flow of fuel gas.

14. A method according to claim 11 further comprising the step of regulating the flow of said flow of fuel gas.

* * * * *

UNITED STATES PATENT AND TRADEMARK OFFICE
CERTIFICATE OF CORRECTION

PATENT NO. : 6,401,459 B1
DATED : June 11, 2002
INVENTOR(S) : Craig S. Tiras

It is certified that error appears in the above-identified patent and that said Letters Patent is hereby corrected as shown below:

<u>Column 2,</u>
Line 37, please delete the number "30" and replace it with -- 40 --.

<u>Column 3,</u>
Line 27, please delete the word "as" and replace it with -- a --.
Line 30, please delete the word "said" and replace it with -- a --.

Signed and Sealed this

Twenty-second Day of October, 2002

*Attest:*

JAMES E. ROGAN
*Attesting Officer*     *Director of the United States Patent and Trademark Office*